US011947930B1

(12) United States Patent
Zhang et al.

(10) Patent No.: US 11,947,930 B1
(45) Date of Patent: Apr. 2, 2024

(54) METHOD AND DEVICE FOR REMOTE ACQUISITION OF CORRELATED PSEUDO-RANDOM NUMBERS BASED ON SEMI-TRUSTED HARDWARE

(71) Applicants: ZHEJIANG UNIVERSITY, Zhejiang (CN); ZJU-HANGZHOU GLOBAL SCIENTIFIC AND TECHNOLOGICAL INNOVATION CENTER, Zhejiang (CN)

(72) Inventors: Bingsheng Zhang, Hangzhou (CN); Yibiao Lu, Hangzhou (CN); Weiran Liu, Hangzhou (CN); Kui Ren, Hangzhou (CN)

(73) Assignees: ZHEJIANG UNIVERSITY, Hangzhou (CN); ZJU-HANGZHOU GLOBAL SCIENTIFIC AND TECHNOLOGICAL INNOVATION CENTER, Hangzhou (CN)

( * ) Notice: Subject to any disclaimer, the term of this patent is extended or adjusted under 35 U.S.C. 154(b) by 0 days.

(21) Appl. No.: 18/536,280

(22) Filed: Dec. 12, 2023

Related U.S. Application Data

(63) Continuation of application No. PCT/CN2021/141676, filed on Dec. 27, 2021.

(30) Foreign Application Priority Data

Dec. 24, 2021 (CN) .......................... 202111598444.6

(51) Int. Cl.
*G06F 7/58* (2006.01)
*H04L 9/06* (2006.01)

(52) U.S. Cl.
CPC ................ *G06F 7/582* (2013.01); *H04L 9/06* (2013.01); *H04L 9/0656* (2013.01); *H04L 9/0662* (2013.01); *H04L 2209/30* (2013.01)

(58) Field of Classification Search
CPC .......... G06F 7/582; G06F 7/58; G06F 21/602; H04L 2209/30; H04L 9/06; H04L 9/0656; H04L 9/0662
(Continued)

(56) References Cited

U.S. PATENT DOCUMENTS

| 10,846,372 | B1 * | 11/2020 | Jayachandran | ....... H04L 9/3239 |
| 2018/0331832 | A1 * | 11/2018 | Pulsifer | ................ H04L 9/3247 |

(Continued)

FOREIGN PATENT DOCUMENTS

| CN | 108334553 A | 7/2018 |
| CN | 112631549 A | 4/2021 |

(Continued)

OTHER PUBLICATIONS

International Search Report (PCT/CN2021/141676); dated Sep. 21, 2022.

*Primary Examiner* — Allen Chan
(74) *Attorney, Agent, or Firm* — W&G Law Group

(57) ABSTRACT

A method and a device for remote acquisition of correlated pseudo-random numbers based on semi-trusted hardware. When applied to semi-trusted hardware, the method comprises: acquiring a random seed of a sender and a selected number of a receiver; generating a plurality of first correlated pseudo-random numbers and first commitment seeds according to the random seed and a predetermined category of the correlated pseudo-random number; generating a first commitment value and a first open value by a commitment mechanism according to the first correlated pseudo-random numbers and the first commitment seeds; generating a Merkle proof according to the first commitment value and the selected number; sending the first correlated pseudo-
(Continued)

random numbers, the first commitment value, the first open value and the Merkle proof corresponding to the selected number to the receiver.

10 Claims, 5 Drawing Sheets

(58) Field of Classification Search
    USPC .......................................................... 708/250
    See application file for complete search history.

(56) References Cited

U.S. PATENT DOCUMENTS

| | | | |
|---|---|---|---|
| 2019/0205898 A1* | 7/2019 | Greco | G06Q 20/389 |
| 2020/0126075 A1* | 4/2020 | Fisch | G06F 21/6245 |
| 2020/0219097 A1* | 7/2020 | Chan | G06F 16/2379 |
| 2020/0313896 A1* | 10/2020 | Micali | H04L 9/50 |
| 2020/0322132 A1* | 10/2020 | Covaci | H04L 9/0637 |
| 2021/0192498 A1 | 6/2021 | Chan et al. | |

FOREIGN PATENT DOCUMENTS

| | | | |
|---|---|---|---|
| CN | 113489584 A | 10/2021 | |
| CN | 113569294 A | 10/2021 | |
| WO | 2016204970 A1 | 12/2016 | |

* cited by examiner

US 11,947,930 B1

METHOD AND DEVICE FOR REMOTE ACQUISITION OF CORRELATED PSEUDO-RANDOM NUMBERS BASED ON SEMI-TRUSTED HARDWARE

CROSS-REFERENCE TO RELATED APPLICATIONS

The present application is a continuation of International Application No. PCT/CN2021/141676, filed on Dec. 27, 2021, which claims priority to Chinese Application No. 202111598444.6, filed on Dec. 24, 2021, the contents of both of which are incorporated herein by reference in their entireties.

TECHNICAL FIELD

The present disclosure relates to the field of privacy protection data processing, in particular to a method and a device for remote acquisition of correlated pseudo-random numbers based on semi-trusted hardware.

BACKGROUND

Secure Multi-party Computation (MPC) technology can make multiple participants who do not trust each other collaborate to calculate a pre-agreed function, while not revealing any information except the function output, such as the private input of the participants. In secure multi-party computation protocols, correlated randomness is often used as a part of the protocol. For example, Random Oblivious Transfer (ROT) and Beaver triple can be regarded as correlated pseudo-random numbers.

Because the participants of the protocol do not trust each other, and they are often connected through remote channels, how to generate correlated pseudo-random numbers and let the participants obtain appropriate correlated pseudo-random numbers needs careful consideration. At present, a common practice is to let all the participants in the protocol run a simple secure multi-party computing protocol. The function of this protocol is to let all the participants get the corresponding correlated pseudo-random numbers. In this protocol, the input of each participant has nothing to do with the input when calculating the function, so this protocol can be run before the participants get the function input, that is, the offline phase of calculation. Another way is to use semi-trusted hardware. By inputting the seeds of correlated pseudo-random number and the type of correlated pseudo-random numbers that each participant needs to acquire into the trusted hardware, the semi-trusted hardware can directly output the corresponding correlated pseudo-random numbers to each participant.

However, in the process of realizing the present disclosure, the inventor found that there are at least the following problems in the prior art:

For the technology of using secure multi-party computing protocol to generate correlated pseudo-random numbers, this method requires a large amount of communication, many communication rounds, and takes a long time in the actual operation process, which leads to the participants needing to run the protocol to generate correlated pseudo-random numbers before the formal calculation, therefore it is impossible to directly execute the secure multi-party computing protocol for calculation when the calculation is needed. Moreover, the generated correlated pseudo-random numbers need to be stored in the storage medium for a long time, resulting in a large overhead. For the technology of using semi-trusted hardware to generate correlated pseudo-random numbers, this method introduces an additional trusted root, which depends on the assumption that semi-trusted hardware will correctly generate correlated pseudo-random numbers and output the results, but if this assumption fails, it will affect the correctness of the overall secure multiparty computing protocol. Generally speaking, the prior art either has the problems of large communication volume, many communication rounds and long time consumption, or the correctness of the obtained correlated pseudo-random number cannot be guaranteed, so it is difficult to give consideration to both efficiency and correctness.

SUMMARY

The embodiment of the present disclosure aims to provide a method and a device for remote acquisition of correlated pseudo-random numbers based on semi-trusted hardware, so as to solve the technical problem in related technologies that correlated pseudo-random numbers of a polynomial magnitude cannot be transmitted to remote participants with low traffic overhead.

According to a first aspect of the embodiment of the present disclosure, there is provided a method for remote acquisition of correlated pseudo-random numbers based on semi-trusted hardware. In an embodiment, the method is applied to semi-trusted hardware and includes the following steps of:

acquiring a random seed of a sender and a selected number of a receiver;

generating a plurality of first correlated pseudo-random numbers and first commitment seeds according to the random seed and a predetermined category of the correlated pseudo-random number;

generating a first commitment value and a first open value by a commitment mechanism according to the first correlated pseudo-random numbers and the first commitment seeds;

generating a Merkle proof according to the first commitment value and the selected number; and sending the first correlated pseudo-random numbers, the first commitment value, the first open value and the Merkle proof corresponding to the selected number to the receiver, so that the receiver verifies the first commitment value according to a Merkle root and the Merkle proof sent by the sender and verifies the correlated pseudo-random numbers corresponding to the selected number according to the verified first commitment value and the first open value.

Further, the step of acquiring a random seed of a sender and a selected number of a receiver includes:

receiving an encrypted random seed of the sender and a random number of the receiver;

decrypting the encrypted random seed according to a symmetric key of the sender and the semi-trusted hardware;

verifying a result obtained after verification; and obtaining the random seed of the sender if the verification is passed.

Further, the step of generating a plurality of first correlated pseudo-random numbers and first commitment seeds according to the random seed and a predetermined category of the correlated pseudo-random number includes:

expanding the random seed into a first pseudo-random seed and a second pseudo-random seed;

generating the plurality of first correlated pseudo-random numbers according to the predetermined category of correlated pseudo-random numbers and the first pseudo-random seed; and generating a plurality of first commitment seeds according to the second pseudo-random seed. In an embodiment, a number of the first commitment seeds is the same as a number of the first correlated pseudo-random numbers.

According to a second aspect of the embodiment of the present disclosure, there is provided a device for remote acquisition of correlated pseudo-random numbers based on semi-trusted hardware. In an embodiment, the device is applied to semi-trusted hardware and includes:

a first acquisition module configured to acquire a random seed of a sender and a selected number of a receiver;

a first generation module configured to generate a plurality of first correlated pseudo-random numbers and first commitment seeds according to the random seed and a predetermined category of the correlated pseudo-random number;

a second generation module configured to generate a first commitment value and a first open value by a commitment mechanism according to the first correlated pseudo-random numbers and the first commitment seeds;

a third generation module configured to generate a Merkle proof according to the first commitment value and the selected number; and a first sending module configured to send the first correlated pseudo-random numbers, the first commitment value, the first open value and the Merkle proof corresponding to the selected number to the receiver, so that the receiver verifies the first commitment value according to a Merkle root and the Merkle proof sent by the sender and verifies the correlated pseudo-random numbers corresponding to the selected number according to the verified first commitment value and the first open value.

According to a third aspect of the embodiment of the present disclosure, there is provided a method for remote acquisition of a correlated pseudo-random numbers based on semi-trusted hardware. In an embodiment, the method is applied to the sender and includes the following steps of:

verifying the semi-trusted hardware and obtaining a symmetric key shared with the semi-trusted hardware;

encrypting a random seed and sending the random seed to a receiver according to the symmetric key, so that the receiver can send the encrypted random seed of a sender and a selected number of the receiver to the semi-trusted hardware, so that the semi-trusted hardware can obtain the random seed of the sender and the selected number of the receiver; generating a plurality of first correlated pseudo-random numbers and first commitment seeds according to the random seed and a predetermined category of correlated pseudo-random numbers; generating a first commitment value and a first open value by a commitment mechanism according to the first correlated pseudo-random numbers and the first commitment seeds; generating a Merkle proof according to the first commitment value and the selected number; sending the first correlated pseudo-random numbers, the first commitment value, the first open value and the Merkle proof corresponding to the selected number to the receiver;

generating a plurality of second correlated pseudo-random numbers and second commitment seeds according to the random seed and the predetermined category of correlated pseudo-random numbers;

generating a second commitment value according to the plurality of second correlated pseudo-random numbers and the second commitment seeds;

generating a Merkle root according to the second commitment value; and sending the Merkle root to the receiver, so that the receiver verifies the first commitment value according to the Merkle root and the Merkle proof sent by the sender, and verifies the correlated pseudo-random numbers corresponding to the selected number according to the verified first commitment value and the first open value.

According to a fourth aspect of the embodiment of the present disclosure, there is provided a device for remote acquisition of correlated pseudo-random numbers based on semi-trusted hardware. In an embodiment, the device is applied to a sender and includes:

a first verification module configured to verify the semi-trusted hardware and obtaining a symmetric key shared with the semi-trusted hardware;

a second sending module configured to encrypt random seed and send the random seed to a receiver according to the symmetric key, so that the receiver can send the encrypted random seed of a sender and a selected number of the receiver to the semi-trusted hardware, so that the semi-trusted hardware can obtain the random seed of the sender and the selected number of the receiver; generate a plurality of first correlated pseudo-random numbers and first commitment seeds according to the random seed and a predetermined category of correlated pseudo-random numbers; generate a first commitment value and a first open value by a commitment mechanism according to the first correlated pseudo-random numbers and the first commitment seeds; generate a Merkle proof according to the first commitment value and the selected number; send the first correlated pseudo-random numbers, the first commitment value, the first open value and the Merkle proof corresponding to the selected number to the receiver;

a fourth generation module configured to generate a plurality of second correlated pseudo-random numbers and second commitment seeds according to the random seed and the predetermined category of correlated pseudo-random numbers;

a fifth generation module configured to generate a second commitment value according to the plurality of second correlated pseudo-random numbers and the second commitment seeds;

a sixth generation module configured to generate a Merkle root according to the second commitment value; and a third sending module configured to send the Merkle root to the receiver, so that the receiver verifies the first commitment value according to the Merkle root and the Merkle proof sent by the sender, and verifies the correlated pseudo-random numbers corresponding to the selected number according to the verified first commitment value and the first open value.

According to a fifth aspect of the embodiment of the present disclosure, there is provided a method for remote acquisition of correlated pseudo-random numbers based on semi-trusted hardware. In an embodiment, the method is applied to the receiver and includes the following steps of:

receiving the encrypted random seed sent by a sender;

sending the encrypted random seed and a selected number to the semi-trusted hardware, so that the semi-trusted hardware can obtain the random seeds of the sender and the selected number of a receiver; generating a plurality of first correlated pseudo-random numbers and first commitment seeds according to the random seed and a predetermined category of correlated pseudo-random numbers; generating a first commitment value and a first open value by a commitment mechanism according to the first correlated pseudo-random numbers and the first commitment seeds; generating a Merkle proof according to the first commitment value and the selected number; sending the first correlated pseudo-random numbers, the first commitment value, the first open value and the Merkle proof corresponding to the selected number to the receiver;

verifying the first commitment value according to a Merkle root and the Merkle proof sent by the sender, and verifying the correlated pseudo-random numbers corresponding to the selected number according to the verified first commitment value and the first open value.

According to a sixth aspect of the embodiment of the present disclosure, there is provided a device for remote acquisition of correlated pseudo-random numbers based on semi-trusted hardware. In an embodiment, the device is applied to the receiver and includes:

a receiving module configured to receive encrypted random seed sent by a sender;

a fourth sending module configured to send the encrypted random seed and a selected number to the semi-trusted hardware, so that the semi-trusted hardware can obtain the random seed of the sender and the selected number of a receiver; generate a plurality of first correlated pseudo-random numbers and first commitment seeds according to the random seed and a predetermined category of correlated pseudo-random numbers; generate a first commitment value and a first open value by a commitment mechanism according to the first correlated pseudo-random numbers and the first commitment seeds; generate a Merkle proof according to the first commitment value and the selected number; send the first correlated pseudo-random numbers, the first commitment value, the first open value and the Merkle proof corresponding to the selected number to the receiver;

a second verification module configured to verify the first commitment value according to a Merkle root and the Merkle proof sent by the sender, and verify the correlated pseudo-random numbers corresponding to the selected number according to the verified first commitment value and the first open value.

According to a seventh aspect of the embodiment of the present disclosure, there is provided an electronic device including:

one or more processors;

a memory for storing one or more programs;

In an embodiment, when the one or more programs are executed by the one or more processors, the one or more processors implement the method according to the first or the third or the fifth aspect.

According to an eighth aspect of the embodiment of the present disclosure, there is provided a computer readable storage medium on which computer instructions are stored, when executed by a processor, the instructions implement the steps of the method according to the first or the third or the fifth aspect.

The technical solution provided by the embodiment of the present disclosure can include the following beneficial effects.

It can be seen from the above embodiments that by using semi-trusted hardware, the present disclosure reduces the traffic of remote transmission of correlated pseudo-random numbers, and allows the sender to transmit polynomial-level correlated pseudo-random numbers to the remote receiver with constant-level traffic; according to a plurality of first correlated pseudo-random numbers and first commitment seeds, a commitment mechanism is used to generate a first commitment value and a first open value, and the commitment mechanism ensures the correctness of the semi-trusted hardware output, and at the same time, the receiver is prevented from obtaining undeserved privacy information from the output of the semi-trusted hardware; a Merkle proof is generated according to the first commitment value and the selected number, and the receiver verifies the first commitment value according to the Merkle root and the Merkle proof sent by the sender. By the Merkle tree technology, the sender only needs a constant level of communication to send verification information to the remote receiver while ensuring the information transmission security, and the receiver needs only a logarithmic level of computation and storage space to verify the output of the trusted hardware.

It should be understood that the above general description and the following detailed description are exemplary and explanatory only, and are not intended to limit the present disclosure.

BRIEF DESCRIPTION OF DRAWINGS

The drawings herein are incorporated into and constitute a part of the specification, illustrate embodiments consistent with the present disclosure, and together with the specification, serve to explain the principle of the present disclosure.

DESCRIPTION OF EMBODIMENTS

Figure 1:
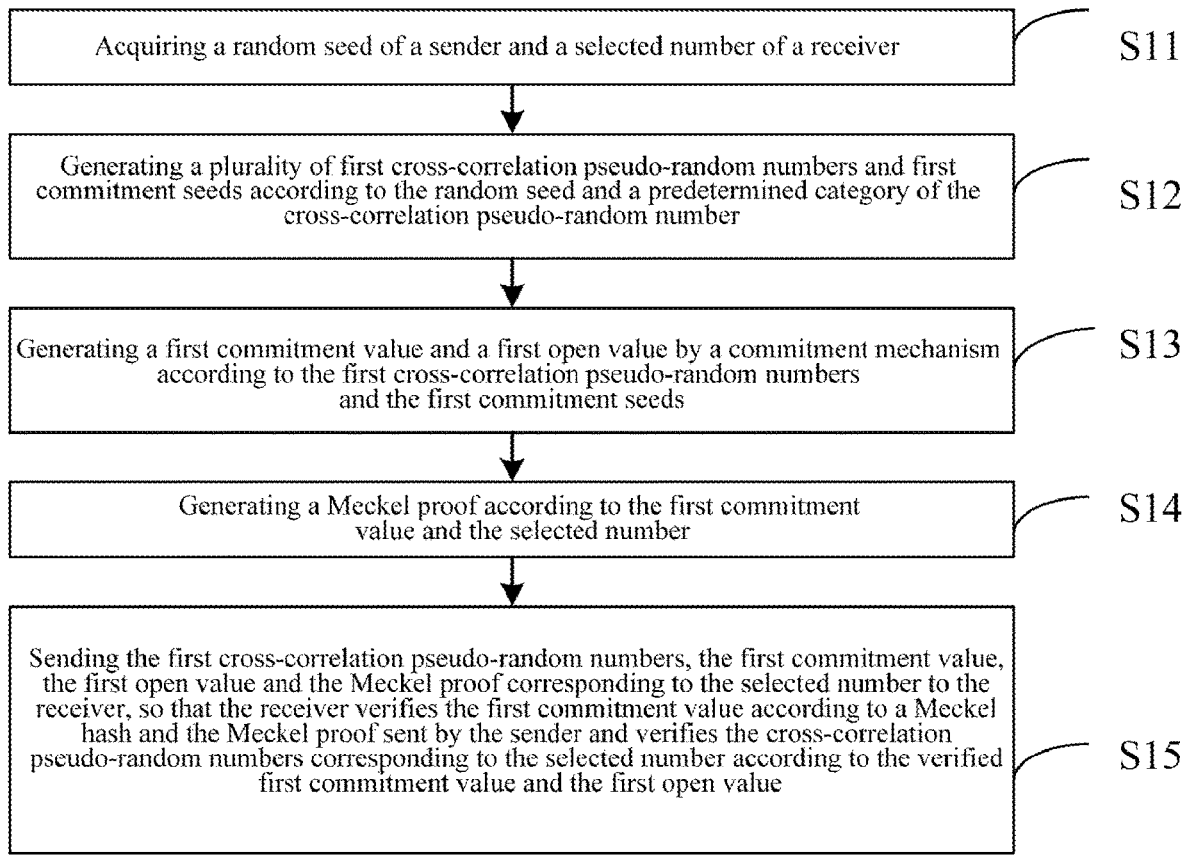
FIG. 1 is a flowchart of a method for remote acquisition of correlated pseudo-random numbers based on semi-trusted hardware (applied to semi-trusted hardware) according to an exemplary embodiment.

Exemplary embodiments will be described here in detail, examples of which are shown in the accompanying drawings. When the following description refers to the drawings, unless otherwise indicated, the same numbers in different drawings indicate the same or similar elements. The embodiments described in the following exemplary embodiments do not represent all the embodiments consistent with this application. On the contrary, they are only examples of devices and methods consistent with some aspects of this application as detailed in the appended claims.

The terminology used in this application is for the purpose of describing specific embodiments only, and is not intended to limit this application. The singular forms of "a", "said" and "the" used in this application and the appended claims are also intended to include plural forms, unless the context clearly indicates other meaning. It should also be understood that the term "and/or" used herein refers to and includes any or all possible combinations of one or more associated listed items.

It should be understood that although the terms first, second, third, etc. may be used in this application to describe various information, these information should not be limited to these terms. These terms are only used to distinguish the same type of information from each other. For example, without departing from the scope of this application, the first information can also be called the second information, and similarly, the second information can also be called the first information. Depending on the context, the word "if" as used here can be interpreted as "when" or "during" or "in response to a determination".

First, the semi-trusted hardware is explained:

In the prior art, trusted hardware can directly get the privacy input of all users, but when the hardware manufacturer is not trusted, it can steal the privacy information of users and change the calculation process by embedding the backdoor. For example, hardware manufacturers can embed information in cryptographic measures generated by trusted hardware by electronic steganography. When remote participants forward the cryptographic measures to a third-party authentication server provided by hardware manufacturers, hardware manufacturers can obtain private information from them. When the user calls the trusted hardware for calculation, the hardware manufacturer can specify its running result at will. In such a scenario, the trusted hardware still plays a protective role for the protocol participants: the local participants cannot get the private input of the remote participants by attacking the trusted hardware, nor can they control the calculation process of the trusted hardware and tamper with the calculation results of the trusted hardware; however, hardware manufacturers have the ability to obtain the privacy input sent by users to trusted hardware and change the output results of trusted hardware, such hardware is called semi-trusted hardware.

Assuming that a user B wants to obtain a pseudo-random number located at a specific position in a series of correlated pseudo-random numbers from a user A. The user B holds a semi-trusted hardware device, and the output of the semi-trusted hardware device needs to be verified. To achieve the above requirements, the user A and user B can acquire a certain correlated pseudo-random number at a specific location by the method for remote acquisition of correlated pseudo-random numbers based on semi-trusted hardware shown below. User A is the sender and user B is the receiver.

In the specific implementation process of the present disclosure, the semi-trusted hardware can be placed inside the receiver, or it can establish a high-speed connection with the receiver. Compared with the characteristics of high latency and low bandwidth of network transmission, placing the semi-trusted hardware inside the receiver or establishing a high-speed connection between the semi-trusted hardware and the receiver can enable the semi-trusted hardware and the receiver to communicate and transmit data in a low latency and high bandwidth channel, thus improving the overall performance of the protocol.

Example 1

FIG. 1 is a flow chart of a method for remote acquisition of correlated pseudo-random numbers based on semi-trusted hardware according to an exemplary embodiment. As shown in FIG. 1, this method is applied to semi-trusted hardware and can include the following steps:

S11, acquiring a random seed of a sender and a selected number of a receiver;

S12, generating a plurality of first correlated pseudo-random numbers and first commitment seeds according to the random seed and a predetermined category of the correlated pseudo-random number;

S13, generating a first commitment value and a first open value by a commitment mechanism according to the first correlated pseudo-random numbers and the first commitment seeds;

S14, generating a Merkle proof according to the first commitment value and the selected number; and S15, sending the first correlated pseudo-random numbers, the first commitment value, the first open value and the Merkle proof corresponding to the selected number to the receiver, so that the receiver verifies the first commitment value according to a Merkle root and the Merkle proof sent by the sender and verifies the correlated pseudo-random numbers corresponding to the selected number according to the verified first commitment value and the first open value.

It can be seen from the above embodiments that by using semi-trusted hardware, the present disclosure reduces the traffic of remote transmission of correlated pseudo-random numbers, and allows the sender to transmit polynomial-level correlated pseudo-random numbers to the remote receiver with constant-level traffic; According to a plurality of first correlated pseudo-random numbers and first commitment seeds, a commitment mechanism is used to generate a first commitment value and a first open value, and the commitment mechanism ensures the correctness of the output of the semi-trusted hardware, and at the same time, the receiver is prevented from obtaining undeserved privacy information from the semi-trusted hardware output; a Merkle proof is generated according to the first commitment value and the selected number, and the receiver verifies the first commitment value according to a Merkle root and the Merkle proof sent by the sender. By the Merkle tree technology, the sender only needs a constant level of communication to send verification information to the remote receiver while ensuring the information transmission security, and the receiver needs only a logarithmic level of computation and storage space to verify the output of the trusted hardware.

In the concrete implementation of step S11, the random seed of the sender and the selected number of the receiver are obtained.

Figure 2:
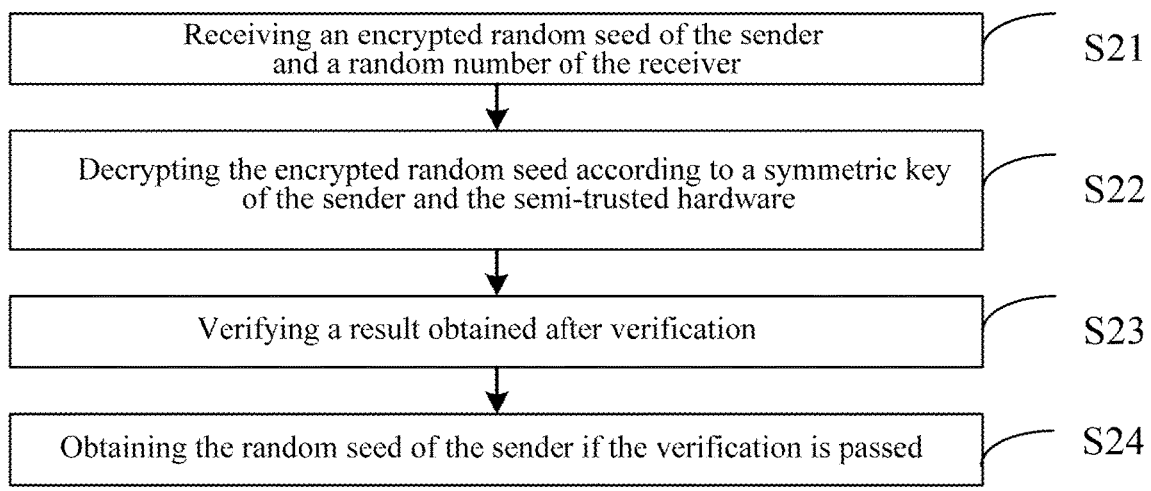
FIG. 2 is a flowchart of step S11 according to an exemplary embodiment.

In an embodiment, as shown in FIG. 2, this step includes the following sub-steps:

S21, receiving an encrypted random seed of the sender and a random number of the receiver.

In an embodiment, the semi-trusted hardware receives the encrypted random seed of the sender and the random numbers of the receiver sent by the receiver, where the encrypted random seed of the sender are sent by the sender to the receiver. The function of this step is to enable the semi-trusted hardware of user A and user B to communicate indirectly, while preventing user B from stealing the random seed of the user A.

S22, decrypting the encrypted random seed according to a symmetric key of the sender and the semi-trusted hardware;

S23, verifying a result obtained after verification; and

S24, obtaining the random seed of the sender if the verification is passed.

In the concrete implementation of steps S22-S24, the semi-trusted hardware uses the symmetric key of the sender and the semi-trusted hardware as the decryption key and the encrypted random seed as a ciphertext, and calls the decryption algorithm corresponding to the symmetric encryption algorithm with the message verification codes used by the sender to perform decryption. The decryption algorithm will check the integrity of the message, and if it passes the verification, the plaintext random seed will be output. The purpose of this step is to allow the semi-trusted hardware of user B to receive the random seed sent by user A, while preventing user B from tampering with the random seed.

Figure 3:
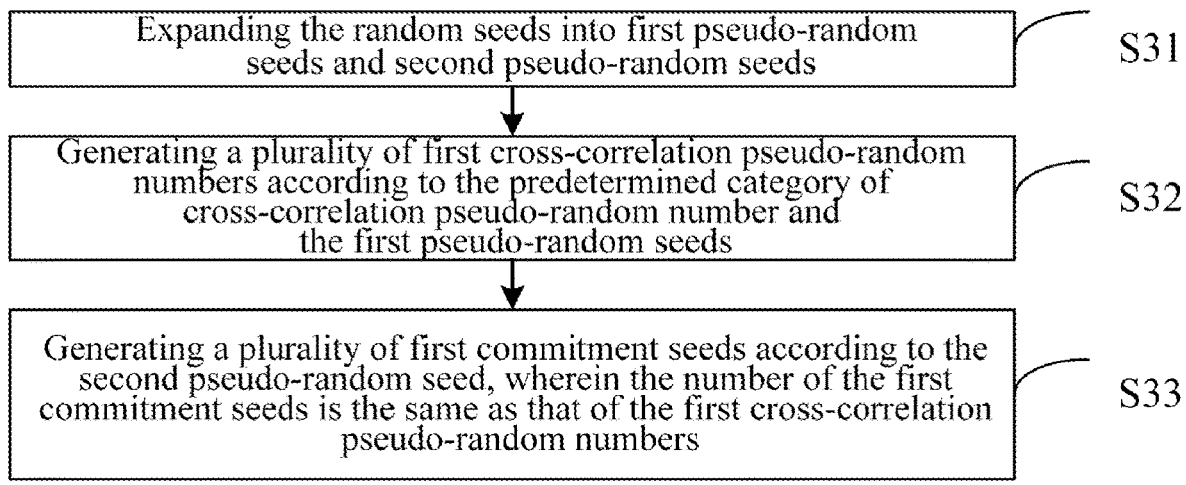
FIG. 3 is a flowchart of step S12 according to an exemplary embodiment.

In the specific implementation of step S12, according to the random seed and the predetermined category of the correlated pseudo-random numbers, a plurality of first correlated pseudo-random numbers and first commitment seeds are generated;

In an embodiment, as shown in FIG. 3, this step includes the following sub-steps:

S31, expanding the random seed into first pseudo-random seed and second pseudo-random seed.

In an embodiment, a pseudo-random function (PRF) is used as a pseudo-random number generator. Given the security parameter c, the pseudo-random function is a deterministic function PRF: K×X→Y defined on (K,X,Y) that can be calculated in polynomial time based on c, where K is the key space, that is, the space composed of all strings of length c, X is the input space, and Y is the output space. Pseudo-random functions cannot be distinguished from real random functions. In an embodiment, the function space formed by all functions defined in the input space X and the output space Y is recorded as F. For an arbitrary key k in K and an optional function f in F, the pseudo-random functions PRF(k, •) and f(•) cannot be distinguished in polynomial time.

Using the random seed s as the key and 0 and 1 as inputs to call the pseudo-random function, s1=PRF(s,0) and s2=PRF(s,1) are obtained, which are the seeds of correlated pseudo-random numbers and commitment seeds, respectively. According to the definition of the pseudo-random function, s1 and s2 can be calculated quickly, and without knowing the key S, s1 and s2 cannot be distinguished from the real random numbers, therefore the receiver cannot get s1 or s2.

S32, generating a plurality of first correlated pseudo-random numbers according to the predetermined category of correlated pseudo-random number and the first pseudo-random seed.

In an embodiment, according to the specified category of correlated pseudo-random number, the first pseudo-random seed s1 is used to generate the first correlated pseudo-random numbers, which is denoted as $m_1, \ldots, m_n$. For example, for random oblivious transfer, PRF(s1,i‖0) and PRF(s1,i‖1) are calculated as the $i^{th}$ group of random oblivious transfer, where "‖" represents splicing, and the required random oblivious transfers can be generated by increasing i from 1 to a predetermined number; for the garbled circuit, the first pseudo-random seed s1 can be used to generate wire labels and garbled seeds respectively according to different optimization forms, and then the garbled seeds can be used to encrypt the wire labels one by one according to the circuit definition to generate the garbled table of each gate. Because the first pseudo-random seed s1 cannot be distinguished from the real random number, even if the receiver knows how to generate the correlated pseudo-random number, it cannot know any information of the generated correlated pseudo-random number.

S33, generating a plurality of first commitment seeds according to the second pseudo-random seed, wherein the number of the first commitment seeds is the same as that of the first correlated pseudo-random numbers.

In an embodiment, the second pseudo-random seed s2 is used to generate a first commitment seed corresponding to the number of first correlated pseudo-random numbers, denoted as $r_1, \ldots, r_n$, where $r_i$=PRF(s2,i). Because the second pseudo-random seed s2 cannot be distinguished from the real random number, $r_i$ is generated by calling PRF with s2 as the key, so the obtained commitment seeds cannot be distinguished from the real random number, and the receiver cannot know any information about the commitment seeds.

In the specific implementation of step S13, a commitment mechanism is used to generate a first commitment value and a first open value according to the first correlated pseudo-random numbers and the first commitment seeds.

In an embodiment, various implementations of the commitment mechanism can be used, and all the commitment values and opening values can be generated by traversing i from 1 to n, where n is the number of the first correlated pseudo-random numbers.

In an embodiment, a Hash function H with collision resistance can be used to realize the commitment mechanism, with the first commitment value being $c_i$=H($m_i$‖$r_i$) and the first opening value being $d_i$=$m_i$‖$r_i$. Because H has collision resistance, once the semi-trusted hardware gives a commitment value, it cannot find other $m_i'$ or $r_i'$, so that $c_i$=H($m_i'$‖$r_i'$), which ensures that the semi-trusted hardware cannot forge false correlated pseudo-random numbers that can be verified by the commitment mechanism. Because H is a one-way function, even if the receiver obtains the commitment values of all cross-correlation pseudorandom numbers, it cannot get any information about the cross-correlation pseudorandom numbers from the commitment values. Furthermore, the Hash function with collision resistance is widely and efficiently implemented in reality, so the design efficiency is high.

In another embodiment, the Pederson commitment mechanism based on discrete logarithm assumption can be adopted. A multiplication group G with an order of a large prime number q is pre-agreed, and G has generators g, h, and tuples (g, h, q) are all public. The first commitment value is $c_i$=$g^{m_i}h^{r_i}$ mod q and the first open value is $d_i$=$r_i$. Because $r_i$ is indistinguishable from the real random number, the receiver cannot get any information about the correlated pseudo-random number from the commitment value, and because of the discrete logarithm assumption, once the semi-trusted hardware gives a commitment value, it cannot find other $m_i'$ or $r_i'$, so that $c_i = g^{m_i'} h^{r_i'} \mod q$, which ensures that the semi-trusted hardware cannot forge false correlated pseudo-random numbers that can be verified by the commitment mechanism.

In the concrete implementation of step S14, a Merkle proof is generated according to the first commitment values and the selected number.

In an embodiment, all the first commitment values are used to generate a Merkle tree according to the definition of a Merkle tree, and a corresponding Merkle proof is generated according to the selected number. For convenience, assuming that the number of the first correlated pseudo-random numbers is $2^d$, and if the number is not the exponential number of 2, it will be filled with a null message to the exponential number of 2. For the first commitment values arranged in the order of generation, i is traversed from 1 to $2^d$, and the Hash function H is called for the $i^{th}$ commitment value to obtain the first-layer Merkle tree node $t_i^1 = H(c_i)$. j is traversed from 1 to d, i is traversed from 1 to $2^{d-j}$ for the $j^{th}$ Merkle tree node in the $2^{d-j+1}$ Merkle tree nodes arranged in the order of generation, and the Hash function H is called for the $2*i-1^{th}$ and the $2*i^{th}$ commitment values to obtain the $j+1^{st}$ layer of Merkle tree node $t_i^{j+1} = H(t_{2*i-1}^j \| t_{2*i}^j)$. In this way, a binary tree with depth of d and layers of d+1 is formed, which is called a Merkle Tree, and the node $t_1^{d+1}$ of the d+1$^{th}$ layer is called a Merkle root. The Merkle proof is the values of all the sibling nodes on the path from the first-layer Merkle tree node corresponding to the selected number to the Merkle tree root node of the d+1 layer. For example, if the selected number is 1, the corresponding Merkle proof is the values of the nodes $t_2^1$, $t_2^2$, ..., $t_2^d$.

In the specific implementation of step S15, the first correlated pseudo-random number, the first commitment value, the first open value and the Merkle proof corresponding to the selected number are sent to the receiver, so that the receiver verifies the first commitment value according to the Merkle root and the Merkle proof sent by the sender, and verifies the correlated pseudo-random number corresponding to the selected number according to the verified first commitment value and the first open value.

In an embodiment, the Merkle root is generated by a sender according to a second commitment value, which is generated according to a plurality of second correlated pseudo-random numbers and second commitment seeds. The second correlated pseudo-random numbers and second commitment seeds are generated according to the random seed and predetermined category of the correlated pseudo-random numbers. The second correlated pseudo-random number is the same as the first correlated pseudo-random number, the second commitment seed is the same as the first commitment seed, and the second commitment value is the same as the first commitment.

In an embodiment, the receiver first uses the Merkle root and the Merkle Proof to verify the first commitment value. The receiver calls the Hash function H to the first commitment value as the first layer of Merkle tree nodes corresponding to the selected number, then the receiver reads the Merkle tree nodes in the Merkle proof one by one, calls the Hash function H to the currently held Merkle tree nodes and the Merkle tree nodes read from the Merkle proof to obtain the next layer of Merkle tree nodes, thus obtaining the root node value of the Merkle tree, and comparing it with the Merkle root hash; if they are the same, the verification is passed. For example, if the selected number is 1, the Hash function is called for the first commitment value, and the first-layer of Merkle tree nodes $t_1^1$ is obtained. Then, i is traversed from 1 to d, $t_2^i$ is read from the Merkle proof one by one, and the Hash function is called together for $t_1^i$ to obtain $t_1^{i+1}$, and finally $t_1^{d+1}$ will be compared with the Merkle root hash, and if it is the same, it will pass the verification. After the Merkle tree verification is passed, the receiver uses the first commitment value and the first open value to verify the correlated pseudo-random number corresponding to the selected number, and the specific verification method needs to correspond to the aforementioned commitment implementation mode. For the implementation of the Hash function H based on collision resistance, the first open value contains the correlated pseudo-random number corresponding to the selected number and the commitment seed corresponding to the selected number, the receiver verifies whether the correlated pseudo-random number contained in the first open value is the same as the correlated pseudo-random number received by itself, calls the Hash function H to the first open value after verification, and verifies whether the output result is the same as the first commitment value, if so, all verification processes are passed; for the Pederson commitment mechanism, the receiver calculates $c_i = g^{m_i} h^{r_i} \mod q$ and verifies whether $c_i$ is the same with the first commitment value, and if it is the same, all verification processes are passed.

Corresponding to the aforementioned embodiment of the method for remote acquisition of correlated pseudo-random numbers based on semi-trusted hardware, this application also provides an embodiment of the device for remote acquisition of correlated pseudo-random numbers based on semi-trusted hardware.

Figure 4:
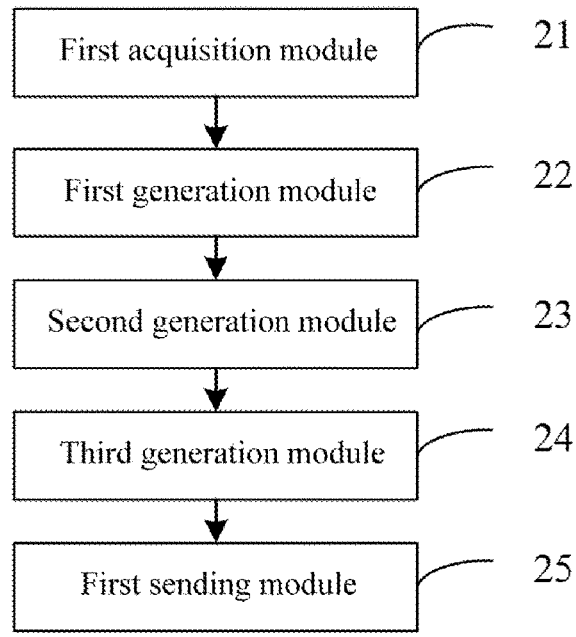
FIG. 4 is a block diagram of \device for remote acquisition of correlated pseudo-random numbers based on semi-trusted hardware (applied to semi-trusted hardware) according to an exemplary embodiment.

FIG. 4 is a block diagram of a device for remote acquisition of correlated pseudo-random numbers based on semi-trusted hardware according to an exemplary embodiment. Referring to FIG. 4, the device is applied to semi-trusted hardware, including:

a first acquisition module 21 used to acquire a random seed of a sender and a selected number of a receiver;

a first generation module 22 used to generate a plurality of first correlated pseudo-random numbers and first commitment seeds according to the random seed and a predetermined category of the correlated pseudo-random number;

a second generation module 23 used to generate a first commitment value and a first open value by a commitment mechanism according to the first correlated pseudo-random numbers and the first commitment seeds;

a third generation module 24 used to generate a Merkle proof according to the first commitment value and the selected number; and a first sending module 25 used to send the first correlated pseudo-random numbers, the first commitment value, the first open value and the Merkle proof corresponding to the selected number to the receiver, so that the receiver verifies the first commitment value according to a Merkle root and the Merkle proof sent by the sender and verifies the correlated pseudo-random numbers corresponding to the selected number according to the verified first commitment value and the first open value.

Example 2

Figure 5:
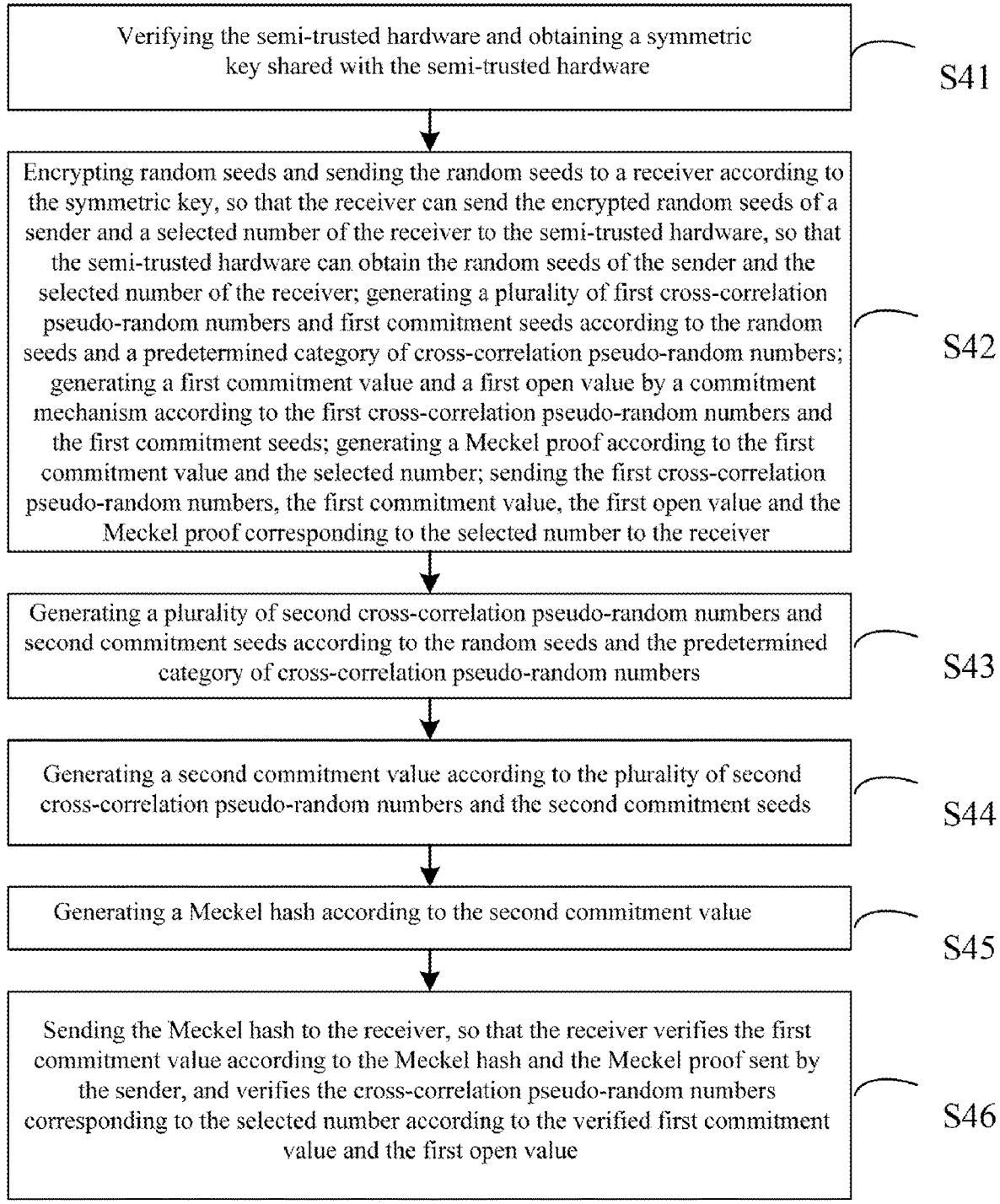
FIG. 5 is a flowchart of a method for remote acquisition of correlated pseudo-random numbers based on semi-trusted hardware (applied to a sender) according to an exemplary embodiment.

FIG. 5 is a flow chart of a method for remote acquisition of correlated pseudo-random numbers based on semi-trusted hardware according to an exemplary embodiment. As shown in FIG. 5, the method is applied to a sender and may include the following steps:

S41, verifying the semi-trusted hardware and obtaining a symmetric key shared with the semi-trusted hardware.

In an embodiment, according to the remote authentication rules formulated by the hardware manufacturer, the user A initiates multiple rounds of challenge requests to the user B, and the user B forwards these challenge requests to semi-trusted hardware, which responds to these requests. The user B forwards the response information to user A, and the user A verifies the authenticity and availability of semi-trusted hardware by communicating with a third-party trusted server provided by the hardware manufacturer.

S42, encrypting random seed and sending the random seed to a receiver according to the symmetric key, so that the receiver can send the encrypted random seed of a sender and a selected number of the receiver to the semi-trusted hardware, so that the semi-trusted hardware can obtain the random seed of the sender and the selected number of the receiver; generating a plurality of first correlated pseudo-random numbers and first commitment seeds according to the random seed and a predetermined category of correlated pseudo-random numbers; generating a first commitment value and a first open value by a commitment mechanism according to the first correlated pseudo-random numbers and the first commitment seeds; generating a Merkle proof according to the first commitment value and the selected number; sending the first correlated pseudo-random numbers, the first commitment value, the first open value and the Merkle proof corresponding to the selected number to the receiver.

In an embodiment, according to the symmetric key, the random seed is encrypted using a symmetric encryption algorithm with message authentication codes, such as the AES-GCM algorithm. Then, the encrypted random seed is sent to the receiver, so that the receiver sends the encrypted random seed of the sender and the selected number of the receiver to the semi-trusted hardware, so that the semi-trusted hardware executes the process of steps S11-S15.

S43, generating a plurality of second correlated pseudo-random numbers and second commitment seeds according to the random seed and the predetermined category of correlated pseudo-random numbers.

In an embodiment, the generation process is the same as that of step S12, and will not be repeated here.

S44, generating a second commitment value according to the plurality of second correlated pseudo-random numbers and the second commitment seeds;

In an embodiment, the generation process of the second commitment value is the same as the generation process of the first commitment value in step S13, which is not repeated here.

S45, generating a Merkle root according to the second commitment value;

In an embodiment, according to the definition of a Merkle tree, all the second commitment values are used to generate a Merkle tree, and a Merkle root hash is generated according to the Merkle tree.

S46: sending the Merkle root to the receiver, so that the receiver verifies the first commitment value according to the Merkle root and the Merkle proof sent by the sender, and verifies the correlated pseudo-random numbers corresponding to the selected number according to the verified first commitment value and the first open value.

In an embodiment, the process of verification by the receiver has been explained in step S15, which will not be repeated here.

Corresponding to the aforementioned embodiment of the method for remote acquisition of correlated pseudo-random numbers based on semi-trusted hardware, this application also provides an embodiment of a device for remote acquisition of correlated pseudo-random numbers based on semi-trusted hardware.

Figure 6:
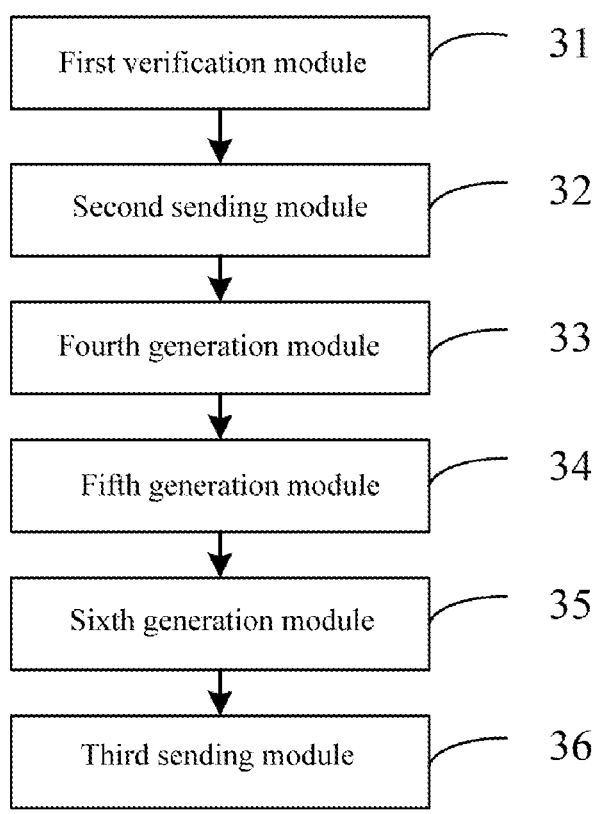
FIG. 6 is a block diagram of a device (applied to a sender) for remote acquisition of correlated pseudo-random numbers based on semi-trusted hardware according to an exemplary embodiment.

FIG. 6 is a block diagram of a device for remote acquisition of correlated pseudo-random numbers based on semi-trusted hardware according to an exemplary embodiment. Referring to FIG. 6, the device is applied to the sender and includes:

a first verification module 31 used to verify the semi-trusted hardware and obtaining a symmetric key shared with the semi-trusted hardware;

a second sending module 32 used to encrypt random seed and send the random seed to a receiver according to the symmetric key, so that the receiver can send the encrypted random seed of a sender and a selected number of the receiver to the semi-trusted hardware, so that the semi-trusted hardware can obtain the random seed of the sender and the selected number of the receiver; generate a plurality of first correlated pseudo-random numbers and first commitment seeds according to the random seed and a predetermined category of correlated pseudo-random numbers; generate a first commitment value and a first open value by a commitment mechanism according to the first correlated pseudo-random numbers and the first commitment seeds; generate a Merkle proof according to the first commitment value and the selected number; send the first correlated pseudo-random numbers, the first commitment value, the first open value and the Merkle proof corresponding to the selected number to the receiver;

a fourth generation module 33 used to generate a plurality of second correlated pseudo-random numbers and second commitment seeds according to the random seed and the predetermined category of correlated pseudo-random numbers;

a fifth generation module 34 used to generate a second commitment value according to the plurality of second correlated pseudo-random numbers and the second commitment seeds;

a sixth generation module 35 used to generate a Merkle root according to the second commitment value; and a third sending module 36 used to send the Merkle root to the receiver, so that the receiver verifies the first commitment value according to the Merkle root and the Merkle proof sent by the sender, and verifies the correlated pseudo-random numbers corresponding to the selected number according to the verified first commitment value and the first open value.

Example 3

Figure 7:
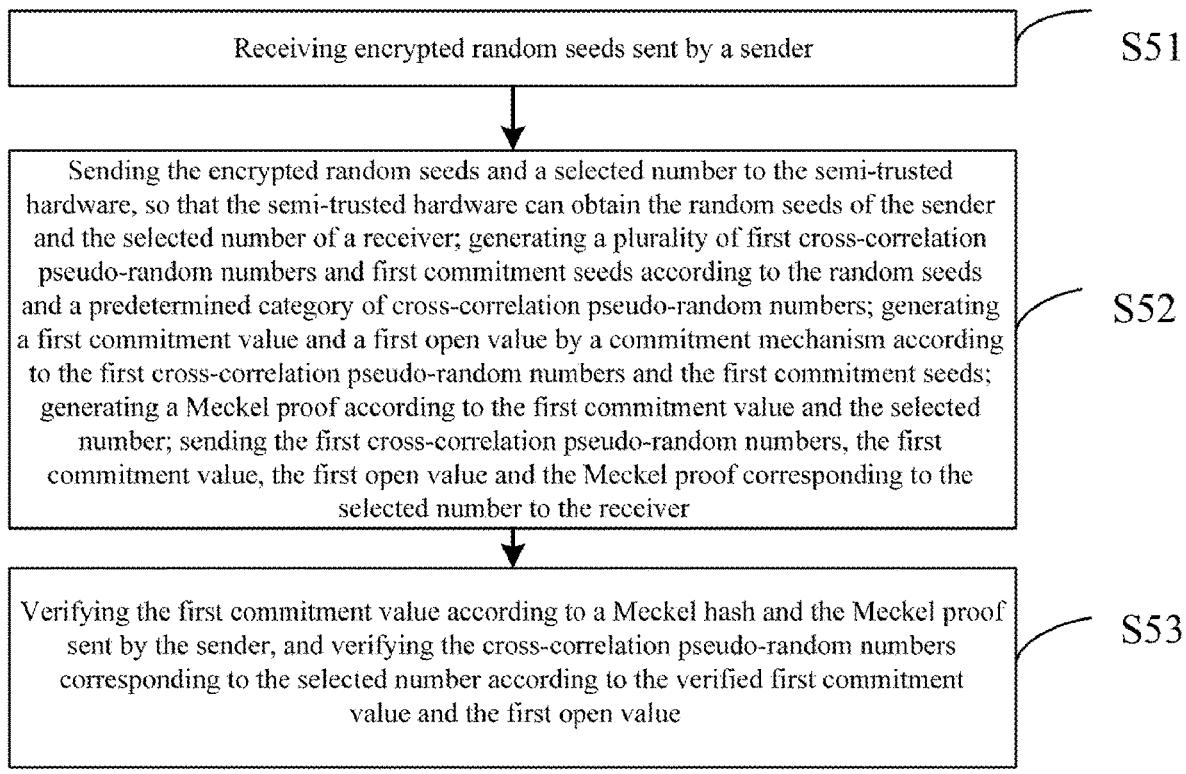
FIG. 7 is a flowchart of a method for remote acquisition of correlated pseudo-random numbers based on semi-trusted hardware (applied to a receiver) according to an exemplary embodiment.

FIG. 7 is a flowchart of a method for remote acquisition of correlated pseudo-random numbers based on semi-trusted hardware according to an exemplary embodiment. As shown in FIG. 7, the method is applied to a receiver and may include the following steps:

S51, receiving encrypted random seed sent by a sender;

S52, sending the encrypted random seed and a selected number to the semi-trusted hardware, so that the semi-trusted hardware can obtain the random seed of the sender and the selected number of a receiver; generating a plurality of first correlated pseudo-random numbers and first commitment seeds according to the random seed and a predetermined category of correlated pseudo-random numbers; generating a first commitment value and a first open value by a commitment mechanism according to the first correlated pseudo-random numbers and the first commitment seeds; generating a Merkle proof according to the first commitment value and the selected number; sending the first correlated pseudo-random numbers, the first commitment value, the first open value and the Merkle proof corresponding to the selected number to the receiver;

S53, verifying the first commitment value according to a Merkle root and the Merkle proof sent by the sender, and verifying the correlated pseudo-random numbers corresponding to the selected number according to the verified first commitment value and the first open value.

In an embodiment, the specific implementation of steps S51-S53 has been explained above, and will not be repeated here.

Corresponding to the aforementioned embodiment of the method for remote acquisition of correlated pseudo-random numbers based on semi-trusted hardware, this application also provides an embodiment of the device for remote acquisition of correlated pseudo-random numbers based on semi-trusted hardware.

Figure 8:
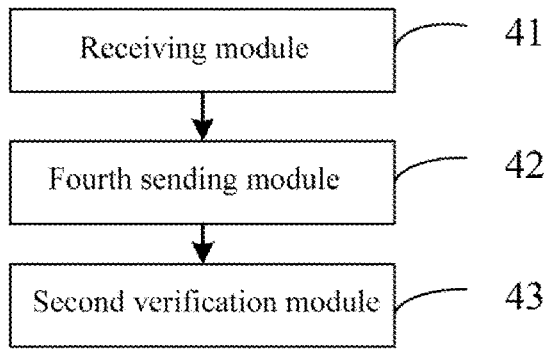
FIG. 8 is a block diagram of a device (applied to a receiver) for remote acquisition of correlated pseudo-random numbers based on semi-trusted hardware according to an exemplary embodiment.

FIG. 8 is a block diagram of a device for remote acquisition of correlated pseudo-random numbers based on semi-trusted hardware according to an exemplary embodiment. Referring to FIG. 8, the device is applied to the receiver and includes:

a receiving module 41 used to receive encrypted random seed sent by a sender;

a fourth sending module 42 used to send the encrypted random seed and a selected number to the semi-trusted hardware, so that the semi-trusted hardware can obtain the random seed of the sender and the selected number of a receiver; generate a plurality of first correlated pseudo-random numbers and first commitment seeds according to the random seed and a predetermined category of correlated pseudo-random numbers; generate a first commitment value and a first open value by a commitment mechanism according to the first correlated pseudo-random numbers and the first commitment seeds; generate a Merkle proof according to the first commitment value and the selected number; send the first correlated pseudo-random numbers, the first commitment value, the first open value and the Merkle proof corresponding to the selected number to the receiver;

a second verification module 43 used to verify the first commitment value according to a Merkle root and the Merkle proof sent by the sender, and verify the correlated pseudo-random numbers corresponding to the selected number according to the verified first commitment value and the first open value.

With regard to the device in the above embodiment, the specific way in which each module performs operations has been described in detail in the embodiment of the method, and will not be explained in detail here.

As for the device embodiment, it basically corresponds to the method embodiment, so please refer to the partial description of the method embodiment. The above-described device embodiments are only schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the present disclosure solution. Those skilled in the art can understand and implement it without creative labor.

Example 4

Accordingly, the present disclosure also provides an electronic device, which includes one or more processors; a memory for storing one or more programs; wherein when the one or more programs are executed by the one or more processors, the one or more processors realize the method for remote acquisition of correlated pseudo-random numbers based on semi-trusted hardware as described above.

Example 5

Accordingly, this application also provides a computer readable storage medium on which computer instructions are stored. In an embodiment, when executed by a processor, the computer instructions implement the above-mentioned method for remote acquisition of correlated pseudo-random numbers based on semi-trusted hardware.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

It would be easy for those skilled in the art to conceive of other embodiments of this application after considering the specification and practicing the contents disclosed herein. This application is intended to cover any variations, uses or adaptations of this application, which follow the general principles of this application and include common knowledge or common technical means in the technical field not disclosed in this application. And the specification and examples are to be regarded as examples only, and the true scope and spirit of this application are indicated by the following claims.

It should be understood that this application is not limited to the precise structure described above and shown in the drawings, and various modifications and changes can be made without departing from its scope. The scope of this application is limited only by the appended claims.

What is claimed is:

1. A method for remote acquisition of correlated pseudo-random numbers based on semi-trusted hardware, which is applied to semi-trusted hardware, comprising:
    acquiring a random seed of a sender and a selected number of a receiver;
    generating a plurality of first correlated pseudo-random numbers and first commitment seeds according to the random seed and a predetermined category of the correlated pseudo-random number;
    generating a first commitment value and a first open value by a commitment mechanism according to the first correlated pseudo-random numbers and the first commitment seeds;
    generating a Merkle proof according to the first commitment value and the selected number; and
    sending the first correlated pseudo-random numbers, the first commitment value, the first open value and the Merkle proof corresponding to the selected number to the receiver, so that the receiver verifies the first commitment value according to a Merkle root and the Merkle proof sent by the sender and verifies the correlated pseudo-random numbers corresponding to the selected number according to the verified first commitment value and the first open value.

2. The method according to claim 1, wherein said acquiring a random seed of a sender and a selected number of a receiver comprises:
    receiving an encrypted random seed of the sender and a random number of the receiver;
    decrypting the encrypted random seed according to a symmetric key of the sender and the semi-trusted hardware;
    verifying a result obtained after verification; and
    obtaining the random seed of the sender when the verification is passed.

3. The method according to claim 1, wherein said generating a plurality of first correlated pseudo-random numbers and first commitment seeds according to the random seed and a predetermined category of the correlated pseudo-random number comprises:
    expanding the random seed into a first pseudo-random seed and a second pseudo-random seed;
    generating the plurality of first correlated pseudo-random numbers according to the predetermined category of correlated pseudo-random numbers and the first pseudo-random seed; and
    generating a plurality of first commitment seeds according to the second pseudo-random seed, wherein a number of the first commitment seeds is equal to a number of the first correlated pseudo-random numbers.

4. A device for remote acquisition of correlated pseudo-random numbers based on semi-trusted hardware, which is applied to semi-trusted hardware, with the method according to claim 1, comprising:
    a first acquisition module configured to acquire a random seed of a sender and a selected number of a receiver;
    a first generation module configured to generate a plurality of first correlated pseudo-random numbers and a plurality of first commitment seeds according to the random seed and a predetermined category of the correlated pseudo-random number;
    a second generation module configured to generate a first commitment value and a first open value by a commitment mechanism according to the first correlated pseudo-random numbers and the first commitment seeds;

a third generation module configured to generate a Merkle proof according to the first commitment value and the selected number; and a first sending module configured to send the first correlated pseudo-random numbers, the first commitment value, the first open value and the Merkle proof corresponding to the selected number to the receiver, so that the receiver verifies the first commitment value according to a Merkle root and the Merkle proof sent by the sender and verifies the correlated pseudo-random numbers corresponding to the selected number according to the verified first commitment value and the first open value.

5. An electronic device comprising:
one or more processors;
a memory for storing one or more programs;
wherein when the one or more programs are executed by the one or more processors, the one or more processors implement the method according to claim 1.

6. A non-transitory computer readable storage medium on which computer instructions are stored, wherein the instructions, when executed by a processor, implement the method according to claim 1.

7. A method for remote acquisition of correlated pseudo-random numbers based on semi-trusted hardware, which is applied to the sender, comprising:
verifying the semi-trusted hardware and obtaining a symmetric key shared with the semi-trusted hardware;
encrypting a random seed and sending the random seed to a receiver according to the symmetric key, so that the receiver can send the encrypted random seed of a sender and a selected number of the receiver to the semi-trusted hardware, in such a manner that the semi-trusted hardware is capable of obtaining the random seed of the sender and the selected number of the receiver; generating a plurality of first correlated pseudo-random numbers and first commitment seeds according to the random seed and a predetermined category of correlated pseudo-random numbers; generating a first commitment value and a first open value by a commitment mechanism according to the first correlated pseudo-random numbers and the first commitment seeds; generating a Merkle proof according to the first commitment value and the selected number; sending the first correlated pseudo-random numbers, the first commitment value, the first open value and the Merkle proof corresponding to the selected number to the receiver;
generating a plurality of second correlated pseudo-random numbers and second commitment seeds according to the random seed and the predetermined category of correlated pseudo-random numbers;
generating a second commitment value according to the plurality of second correlated pseudo-random numbers and the second commitment seeds;
generating a Merkle root according to the second commitment value; and
sending the Merkle root to the receiver, so that the receiver verifies the first commitment value according to the Merkle root and the Merkle proof sent by the sender, and verifies the correlated pseudo-random numbers corresponding to the selected number according to the verified first commitment value and the first open value.

8. A device for remote acquisition of correlated pseudo-random numbers based on semi-trusted hardware, which is applied to a sender, with the method according to claim 7, comprising:
a first verification module configured to verify the semi-trusted hardware and obtaining a symmetric key shared with the semi-trusted hardware;
a second sending module configured to encrypt a random seed and send the random seed to a receiver according to the symmetric key, so that the receiver can send the encrypted random seed of a sender and a selected number of the receiver to the semi-trusted hardware, in such a manner that the semi-trusted hardware is capable of obtaining the random seed of the sender and the selected number of the receiver; generate a plurality of first correlated pseudo-random numbers and first commitment seeds according to the random seed and a predetermined category of correlated pseudo-random numbers; generate a first commitment value and a first open value by a commitment mechanism according to the first correlated pseudo-random numbers and the first commitment seeds; generate a Merkle proof according to the first commitment value and the selected number; send the first correlated pseudo-random numbers, the first commitment value, the first open value and the Merkle proof corresponding to the selected number to the receiver;
a fourth generation module configured to generate a plurality of second correlated pseudo-random numbers and second commitment seeds according to the random seed and the predetermined category of correlated pseudo-random numbers;
a fifth generation module configured to generate a second commitment value according to the plurality of second correlated pseudo-random numbers and the second commitment seeds;
a sixth generation module configured to generate a Merkle root according to the second commitment value; and
a third sending module configured to send the Merkle root to the receiver, so that the receiver verifies the first commitment value according to the Merkle root and the Merkle proof sent by the sender, and verifies the correlated pseudo-random numbers corresponding to the selected number according to the verified first commitment value and the first open value.

9. A method for remote acquisition of correlated pseudo-random numbers based on semi-trusted hardware, which is applied to the receiver, comprising:
receiving an encrypted random seed sent by a sender;
sending the encrypted random seeds and a selected number to the semi-trusted hardware, in such a manner that the semi-trusted hardware is capable of obtaining the random seed of the sender and the selected number of a receiver; generating a plurality of first correlated pseudo-random numbers and first commitment seeds according to the random seed and a predetermined category of correlated pseudo-random numbers; generating a first commitment value and a first open value by a commitment mechanism according to the first correlated pseudo-random numbers and the first commitment seeds; generating a Merkle proof according to the first commitment value and the selected number; sending the first correlated pseudo-random numbers, the first commitment value, the first open value and the Merkle proof corresponding to the selected number to the receiver; and verifying the first commitment value according to a Merkle root and the Merkle proof sent by the sender, and verifying the correlated pseudo-random numbers corresponding to the selected number according to the verified first commitment value and the first open value.

10. A device for remote acquisition of correlated pseudo-random numbers based on semi-trusted hardware, which is applied to the receiver, with the method according to claim 9, comprising:
   a receiving module configured to receive an encrypted random seed sent by a sender;
   a fourth sending module configured to send the encrypted random seed and a selected number to this capable of obtaining the random seed of the sender and the selected number of a receiver; generate a plurality of first correlated pseudo-random numbers and first commitment seeds according to the random seed and a predetermined category of correlated pseudo-random numbers; generate a first commitment value and a first open value by a commitment mechanism according to the first correlated pseudo-random numbers and the first commitment seeds; generate a Merkle proof according to the first commitment value and the selected number; send the first correlated pseudo-random numbers, the first commitment value, the first open value and the Merkle proof corresponding to the selected number to the receiver; and
   a second verification module configured to verify the first commitment value according to a Merkle root and the Merkle proof sent by the sender, and verify the correlated pseudo-random numbers corresponding to the selected number according to the verified first commitment value and the first open value.

\* \* \* \* \*